United States Patent
Ahn et al.

(10) Patent No.: US 10,596,956 B1
(45) Date of Patent: Mar. 24, 2020

(54) LIGHTING APPARATUS FOR VEHICLE

(71) Applicants: Hyundai Motor Company, Seoul (KR); Kia Motors Corporation, Seoul (KR)

(72) Inventors: Byoung Suk Ahn, Gyeonggi-do (KR); Seung Hyeok Chang, Gyeonggi-do (KR); Jung Wook Lim, Seoul (KR); Ki Hong Lee, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/200,515

(22) Filed: Nov. 26, 2018

(30) Foreign Application Priority Data

Sep. 27, 2018 (KR) .......................... 10-2018-0115107

(51) Int. Cl.
| | |
|---|---|
| *G03B 21/20* | (2006.01) |
| *B60Q 1/50* | (2006.01) |
| *B60Q 1/26* | (2006.01) |
| *F21S 43/14* | (2018.01) |
| *F21S 43/20* | (2018.01) |

(Continued)

(52) U.S. Cl.
CPC .............. *B60Q 1/50* (2013.01); *B60Q 1/2607* (2013.01); *F21S 43/14* (2018.01); *F21S 43/26* (2018.01); *F21S 45/47* (2018.01); *G03B 21/2013* (2013.01); *G03B 21/2033* (2013.01); *B60Q 2400/50* (2013.01); *F21W 2103/60* (2018.01); *F21Y 2105/16* (2016.08); *F21Y 2115/10* (2016.08)

(58) Field of Classification Search
CPC .. G03B 21/008; G03B 21/28; G03B 21/2013; G03B 21/2033; B60Q 1/06; B60Q 1/50; B60Q 1/076; B60Q 1/1415; F21S 43/14; F21S 43/26; F21S 43/23; F21S 43/245; F21S 43/247
See application file for complete search history.

(56) References Cited

U.S. PATENT DOCUMENTS

| | | | |
|---|---|---|---|
| 2009/0046474 A1* | 2/2009 | Sato ........................ | B60Q 1/076 362/466 |
| 2011/0012511 A1* | 1/2011 | Watanabe .............. | B60Q 1/085 315/82 |

(Continued)

FOREIGN PATENT DOCUMENTS

KR 20130141943 12/2013

*Primary Examiner* — Sultan Chowdhury
(74) *Attorney, Agent, or Firm* — Morgan, Lewis & Bockius LLP

(57) ABSTRACT

A lighting apparatus for a vehicle may include a first optical system including a first light source module realizing a predetermined level of resolution using a plurality of individual light-emitting diode chips disposed in a lattice pattern and a first image-forming lens module forming an image; a second optical system including a second light source module having a same configuration as the first light source module and a second image-forming lens module forming an image; a first image projected by the first optical system and a second image projected by the second optical system have different angles of departure; and the first image and the second image are projected onto a road as a third image having an overlapping shape of the first image and the second image.

8 Claims, 4 Drawing Sheets

(51) Int. Cl.
*F21S 45/47* (2018.01)
*F21W 103/60* (2018.01)
*F21Y 115/10* (2016.01)
*F21Y 105/16* (2016.01)

(56) References Cited

U.S. PATENT DOCUMENTS

2012/0025962 A1* 2/2012 Toll .................. B60Q 1/50
                                                340/431
2014/0022068 A1* 1/2014 Usami ............... B60Q 1/143
                                                340/436
2018/0170241 A1* 6/2018 Mizuno ............. F21S 41/141

* cited by examiner

LIGHTING APPARATUS FOR VEHICLE

CROSS REFERENCE TO RELATED APPLICATION

The present application claims priority to Korean Patent Application No. 10-2018-0115107, filed Sep. 27, 2018, the entire contents of which is incorporated herein for all purposes by this reference.

BACKGROUND OF THE INVENTION

Field of the Invention

The present invention generally relates to a lighting apparatus for a vehicle and, more particularly, to a lighting apparatus for a vehicle, the lighting apparatus being able to project two overlapping images having relatively-low resolution in order to realize a high-resolution image while minimizing loss in the intensity of light.

Description of Related Art

A lighting apparatus for a vehicle using light-emitting diodes (LEDs) as a light source includes an LED light source, a printed circuit board (PCB) controlling the supply of electric current to the LED light source, and an image-forming lens forming an image on a road or the like using light projected by the LED light source.

When a specific image (e.g., a letter or a figure) is realized on a road using a lighting system including the LED light source, relatively-low resolution of the image realized on the road may lower the readability of the image.

Thus, it may be desirable to use an optical system realizing high resolution to improve the readability of an image.

A method of providing a high-resolution image using a large number of LED light sources in a limited package of a single optical system was used.

For example, technology for realizing 1024 resolution image using 1024 LEDs in the limited package of the single optical system has been used. However, such a large number of LED light sources used to realize a high-resolution image may significantly increase the price of the optical system, which is problematic.

In addition, ribs may be provided between the LEDs to prevent light leakage. Since increases in the number of LED light sources also increase the number of the ribs, a significant amount of light intensity may also be lost, which is problematic.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a lighting apparatus configured for a vehicle, the lighting apparatus being configured to realize a high-resolution image by projecting two overlapping images having relatively-low resolution, significantly reducing an increase in manufacturing costs while minimizing loss in light intensity.

In various aspects of the present invention, a lighting apparatus configured for a vehicle may include: a first optical system including a first light source module realizing a predetermined level of resolution using a plurality of individual light-emitting diode (LED) chips disposed in a lattice pattern and a first image-forming lens module forming an image; a second optical system including a second light source module having a same configuration as the first light source module and a second image-forming lens module forming an image; a first image projected by the first optical system and a second image projected by the second optical system have different angles of departure; and the first image and the second image are projected onto a road as a third image having an overlapping shape of the first image and the second image.

The first optical system and the second optical system may be configured to project the first image and the second image such that the first image and the second image overlap each other, with one image among the first image and the second image being tilted at predetermined angles in horizontal and vertical directions with respect to the other image.

The first optical system may include a first printed circuit board, the second optical system may include a second printed circuit board, and the first image and the second image are projected while overlapping each other, with one image among the first image and the second image being tilted at predetermined angles in horizontal and vertical directions with respect to the other image, depending on a position of the first light source module connected to the first printed circuit board and a position of the second light source module connected to the second printed circuit board.

The angle of departure of the second image-forming lens may be tilted at predetermined angles in horizontal and vertical directions with respect to the angle of departure of the first image-forming lens, such that the first image and the second image are projected while overlapping each other, with the second image being tilted at predetermined angles in horizontal and vertical directions with respect to the first image.

Each of the first image realized by the first optical system and the second image realized by the second optical system may be an image having resolution corresponding to 256 pixels. The third image projected onto the road as an overlapping image of the first image and the second image may be an image having resolution corresponding to 1024 pixels.

Exemplary embodiments of the present invention are configured to realize a third image having relatively-high resolution of 1024 pixels by projecting first and second images respectively having relatively-low resolution of 256 pixels. Consequently, this can significantly reduce an increase in manufacturing costs on realizing a high-resolution image and, minimize loss in light intensity.

Furthermore, various exemplary embodiments of the present invention can realize an image having high resolution of 1024 pixels using a total of 512 individual LED chips, halving the number of individual LED chips compared to the case in which 1024 individual LED chips are used. This can consequently minimize loss in light intensity when realizing an image having high resolution of 1024 pixels.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
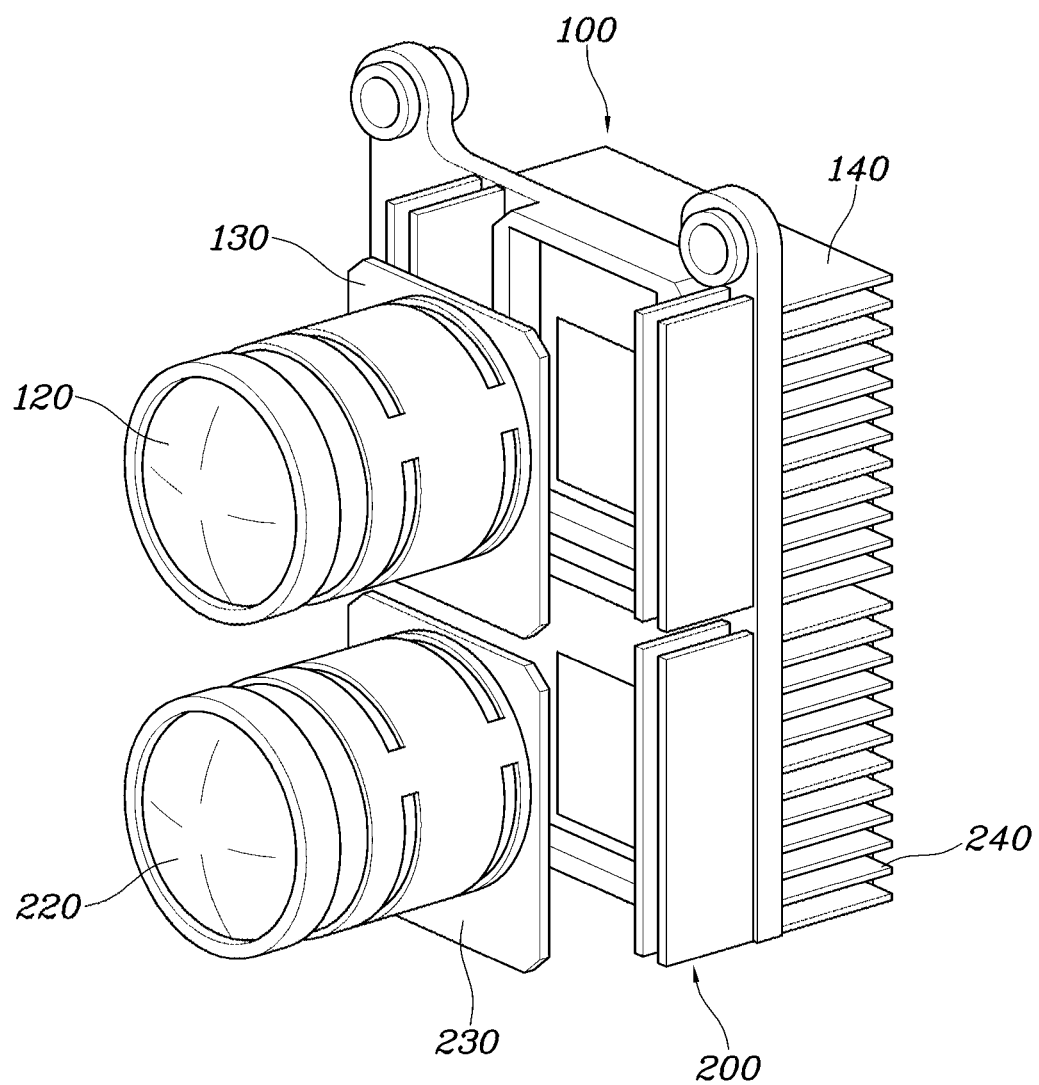
FIG. 1 is a perspective view exemplarily illustrating a lighting apparatus configured for a vehicle according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, a lighting apparatus configured for a vehicle according to exemplary embodiments of the present invention will be described in detail with reference to the accompanying drawings. Throughout the drawings, the same reference numerals will refer to the same or like parts.

In the lighting apparatus configured for a vehicle according to an exemplary embodiment of the present invention, as illustrated in FIGS. 1 to 7, a first optical system 100 and a second optical system 200 are vertically disposed.

The first optical system 100 includes: a first light source module 110 realizing a predetermined level of resolution using a plurality of individual light-emitting diode (LED) chips 111 disposed in a lattice pattern; a first image-forming lens module 120 forming an image; a first printed circuit board (PCB) 130 controlling the supply of electric current to the first light source module 110; and a first cooling module 140.

The second optical system 200 includes a second light source module 210 realizing a predetermined level of resolution using a plurality of individual LED chips 211 disposed in a lattice pattern; a second image-forming lens module 220 forming an image; a second PCB 230 controlling the supply of electric current to the second light source module 210; and a second cooling module 240.

The first light source module 110 and the second light source module 210 have the same number of individual LED chips 111 and 211, and have the same configuration to realize the same level of resolution.

Figure 3:
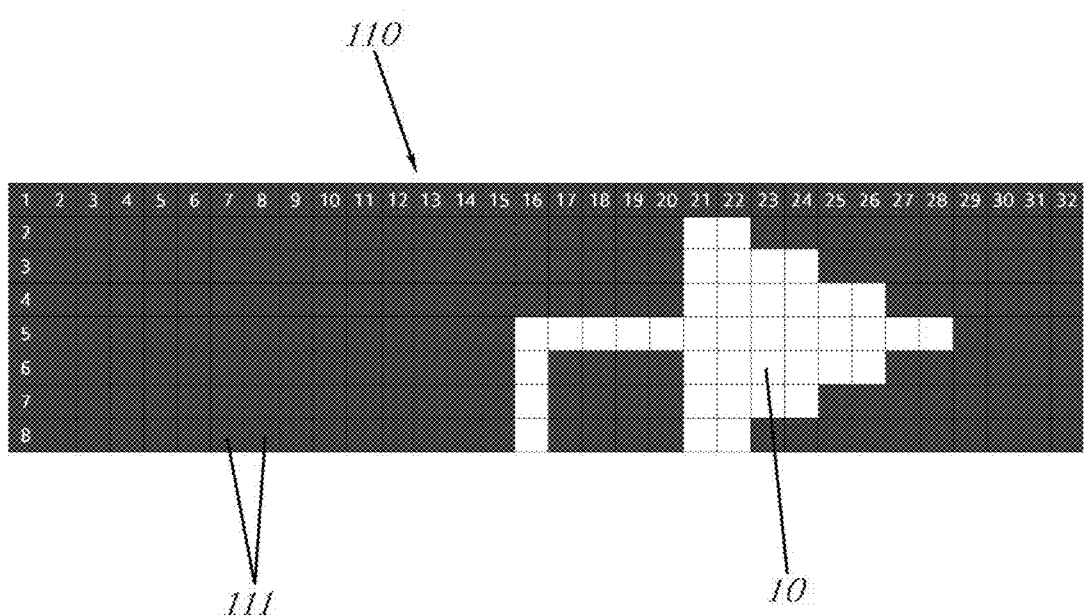
Figure 5:
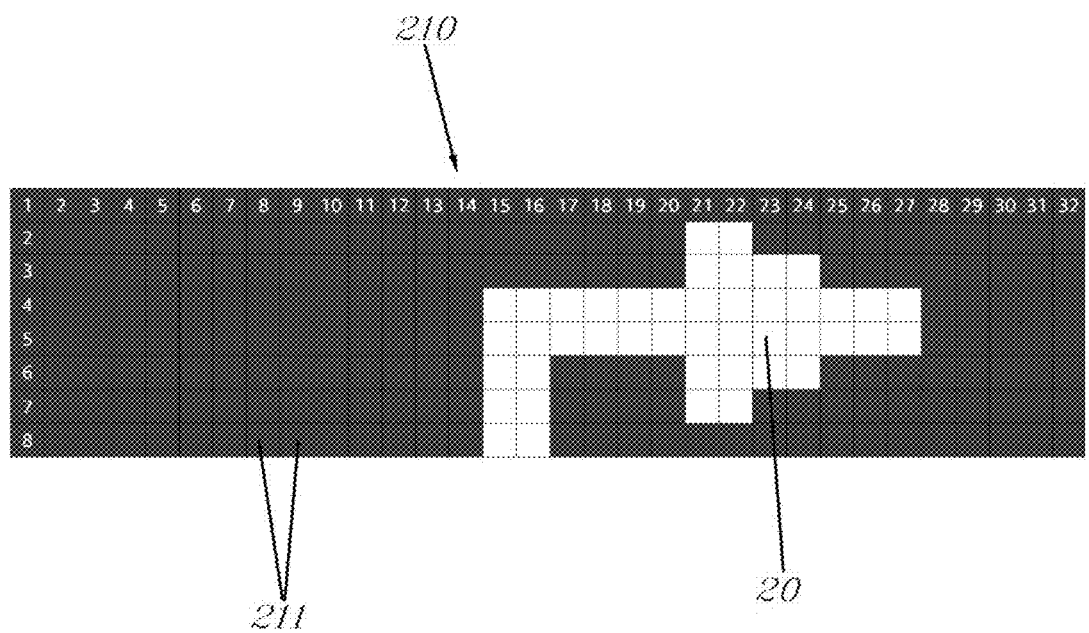

As illustrated in FIGS. 3 and 5, each of the first light source module 110 and the second light source module 210 has a lattice-patterned configuration comprised of a total of 256 individual LED chips 111 or 211, in which thirty two (32) individual LED chips are disposed in a horizontal direction and eight (8) individual LED chips are disposed in a vertical direction thereof. When lighted, the present configuration can realize a first image 10 and a second image 20 respectively having a level of resolution corresponding to 256 pixels.

The first image 10 projected by the first optical system 100 and the second image 20 projected by the second optical system 200 are projected at different oriented angles. The first image 10 and the second image 20 projected at different oriented angles may be projected onto a road as a third image 30 having an overlapping shape of the first image and the second image, as illustrated in FIG. 6.

In other words, as illustrated in FIG. 3, the first light source module 110 realizes the first image 10 having the resolution of 256 pixels using the 256 LED chips 111, and as illustrated in FIG. 5, the second light source module 210 realizes the second image 20 having the resolution of 256 pixels using the 256 LED chips 211.

Figure 6:
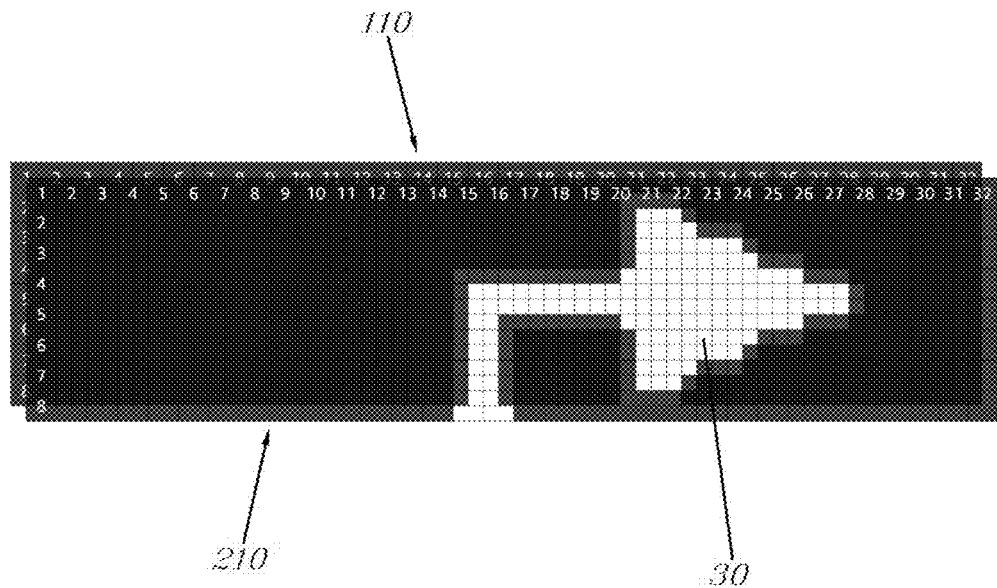
FIG. 6 is a diagram illustrating a third image realized by irradiating the first image and the second image onto a road such that the first and second images overlap.

Thus, when the 256 pixels of the first light source module 110 and the 256 pixels of the second light source module 210 overlap as illustrated in FIG. 6, the third image 30 having a level of resolution corresponding to 1024 pixels is finally projected onto the road.

Figure 7:
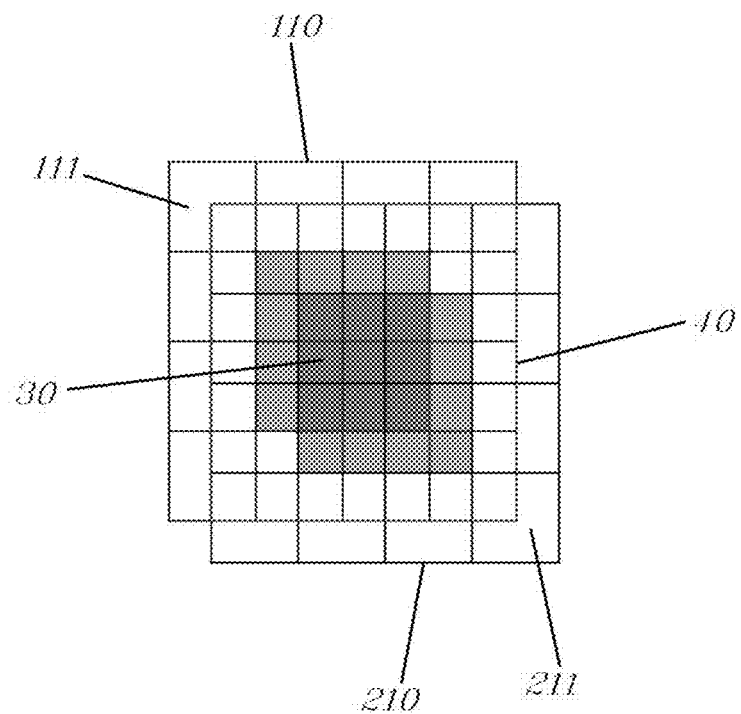
FIG. 7 is a diagram illustrating a concept of realizing the third image having high resolution by overlapping the first and second images having low resolution.

The first light source module 110 and the second light source module 210 may be overlapped such that a single pixel is divided into four regions, as illustrated in FIG. 7. This accordingly makes it possible to realize the third image 30 having the resolution of 1024 pixels using the two light source modules 110 and 210 respectively having 256 pixels.

In FIG. 7, reference numeral 40 is a section in which the individual LED chips 111 and 211 of the first and second light source modules 110 and 210 having 256 pixels overlap such that a single pixel is quadrasected.

The first image 10 having the resolution of 256 pixels realized by the first light source module 110 and the second image 10 having the resolution of 256 pixels realized by the second light source module 210 may be projected while overlapping each other, with one image being tilted at predetermined angles in horizontal and vertical directions with respect to the other image, so that the third image 30 having the resolution of 1024 pixels may be realized.

When first light source module 110 connected to the first PCB 130 and the second light source module 210 connected to the second PCB 230 are adjusted in position, one image among the first image 10 and the second image 20 may be projected tilted at predetermined angles in horizontal and vertical directions with respect to the other image.

Figure 2:
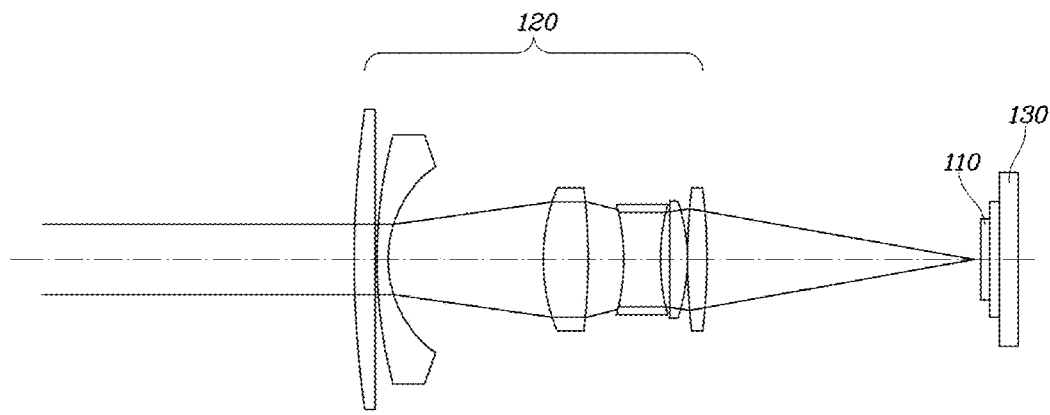
FIG. 2 and FIG. 3 are diagrams illustrating a first optical system according to an exemplary embodiment of the present invention and a first image realized by the first optical system.
Figure 4:
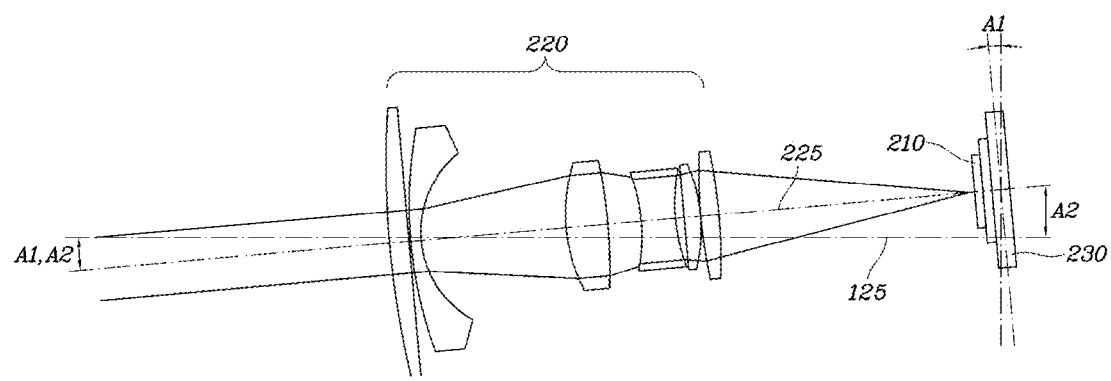
FIG. 4 and FIG. 5 are diagrams illustrating a second optical system according to an exemplary embodiment of the present invention and a second image realized by the second optical system.

For example, the configurations of the first optical system 100 and the second optical system 200 are illustrated in FIGS. 2 and 4. The second optical system 200 may be configured such that the position of the second light source module 210 connected to the second PCB 230 may be tilted at a predetermined angle A1 in a horizontal direction and a predetermined angle A2 in a vertical direction with respect to the first optical system 100. As such, the first image 10 and the second image 20 may be projected while overlapping each other, with the second image 20 of the second optical system 200 being tilted at predetermined angles in horizontal and vertical directions with respect to the first image, finally realizing the third image the having resolution of 1024 pixels.

Furthermore, when the angle of departure of the second image-forming lens module 220 of the second optical system 200 is tilted at predetermined angles A1 and A2 in horizontal and vertical directions with respect to the first image-forming lens module 120 of the first optical system 100, the first image 10 and the second image 20 can also be projected while overlapping each other, with the second image 20 being tilted at predetermined angles in horizontal and vertical directions with respect to the first image 10, finally realizing the third image having the resolution of 1024 pixels.

In an exemplary embodiment of the present invention, optical axis 225 of the second image-forming lens module 220 of the second optical system 200 is tilted at a predetermined angle A1 with respect to optical axis 125 of the first image-forming lens module 120 of the first optical system 100, and the second PCB 230 is tilted at a predetermined angles A2 with respect to an imaginary axis vertical to optical axis 125 of the first image-forming lens module 120 of the first optical system 100.

In an exemplary embodiment of the present invention, the second light source module 210 is tilted at a predetermined angles A2 with respect to an imaginary axis vertical to optical axis 125 of the first image-forming lens module 120 of the first optical system 100 because the second light source module 210 is connected to the second PCB 230.

As set forth above, exemplary embodiment of the present invention can project the first image 10 and the second image 20 having low resolution of 256 pixels such that the images overlap each other, realizing the third image 30 having high resolution of 1024 pixels. This can significantly reduce an increase in manufacturing costs when realizing high-resolution image and, significantly reduce loss in light intensity, which are advantageous.

Generally, 1024 individual LED chips have been used to realize an image having high resolution of 1024 pixels.

In contrast, exemplary embodiment of the present invention is configured to overlap the first image 10 realized using 256 individual LED chips and the second image 20 realized using 256 individual LED chips such that each pixel is quadrasected, finally realizing the third image 30 having high resolution of 1024 pixels.

Accordingly, exemplary embodiment of the present invention can realize an image having high resolution of 1024 pixels using a total of 512 individual LED chips, halving the number of individual LED chips to be used compared to the related-art case in which the 1024 individual LED chips are used. This can significantly reduce manufacturing costs when realizing a high-resolution image corresponding to 1024 pixels, which is advantageous.

Furthermore, when a greater number of individual LED chips are used, a greater number of ribs may be provided between LED chips to prevent light leakage, increasing loss in light intensity.

Accordingly, exemplary embodiment of the present invention can halve the number of individual LED chips used from the case in which 1024 individual LED chips are used, since a high-resolution image corresponding to 1024 pixels may be realized using a total of 512 individual LED chips. Consequently, this can advantageously minimize loss in light intensity when realizing a high-resolution image corresponding to 1024 pixels.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A lighting apparatus for a vehicle, the lighting apparatus comprising:
    a first optical system including:
        a first light source module realizing a predetermined level of resolution using a plurality of individual light-emitting diode chips disposed in a lattice pattern; and
        a first image-forming lens module having at least a lens and configured for forming a first image; and
    a second optical system including:
        a second light source module having a same configuration as the first light source module; and
        a second image-forming lens module having at least a lens and configured for forming a second image;
    wherein the first image projected by the first optical system and the second image projected by the second optical system have different angles of departure to each other,
    wherein the first image and the second image are projected to be overlapped onto a road as a third image having an overlapping shape of the first image and the second image, and
    wherein a longitudinal axis of the second light source module is tilted at a first predetermined angle with respect to an imaginary axis vertical to an optical axis of the first image-forming lens module of the first optical system.

2. The lighting apparatus of claim 1,
    wherein the first optical system and the second optical system are configured to project the first image and the second image such that the first image and the second image overlap each other, with one image among the first image and the second image being tilted at predetermined angles in horizontal and vertical directions with respect to another image among the first image and the second image.

3. The lighting apparatus of claim 1,
    wherein the first optical system includes a first printed circuit board,
    wherein the second optical system includes a second printed circuit board, and wherein the first image and the second image are projected onto the road while overlapping each other, with one image among the first image and the second image being tilted at predetermined angles in horizontal and vertical directions with respect to another image among the first image and the second image, depending on a position of the first light source module connected to the first printed circuit board and a position of the second light source module connected to the second printed circuit board.

4. The lighting apparatus of claim 1,
wherein the angle of departure of the second image-forming lens is tilted at predetermined angles in horizontal and vertical directions with respect to the angle of departure of the first image-forming lens, such that the first image and the second image are projected onto the road while overlapping each other, with the second image being tilted at predetermined angles in horizontal and vertical directions with respect to the first image.

5. The lighting apparatus of claim 1, wherein an optical axis of the second image-forming lens module of the second optical system is tilted at a second predetermined angle with respect to the optical axis of the first image-forming lens module of the first optical system.

6. The lighting apparatus of claim 1, wherein the first light source module is connected to a first printed circuit board and the second light source module is connected to a second printed circuit board.

7. The lighting apparatus of claim 1, wherein the second light source module is connected to a second printed circuit board.

8. The lighting apparatus of claim 1,
wherein each of the first image realized by the first optical system and the second image realized by the second optical system is an image having resolution corresponding to 256 pixels, and
wherein the third image projected onto the road as an overlapping image of the first image and the second image is an image having resolution corresponding to 1024 pixels.

* * * * *